(12) United States Patent  
Kaiser et al.

(10) Patent No.: US 11,387,518 B2  
(45) Date of Patent: Jul. 12, 2022

(54) BATTERY HOUSING PART

(71) Applicant: Mahle International GmbH, Stuttgart (DE)

(72) Inventors: Tilman Kaiser, Leinfelden-Echterdingen (DE); Peter Nowak, Stuttgart (DE); Johannes Weinmann, Stuttgart (DE)

(73) Assignee: Mahle International GmbH

( * ) Notice: Subject to any disclaimer, the term of this patent is extended or adjusted under 35 U.S.C. 154(b) by 137 days.

(21) Appl. No.: 16/865,293

(22) Filed: May 1, 2020

(65) Prior Publication Data

US 2020/0350532 A1    Nov. 5, 2020

(30) Foreign Application Priority Data

May 3, 2019   (DE) ...................... 10 2019 206 408.6

(51) Int. Cl.
*H01M 50/242* (2021.01)
*B60L 50/64* (2019.01)
(Continued)

(52) U.S. Cl.
CPC ........... *H01M 50/242* (2021.01); *B60L 50/64* (2019.02); *H01M 50/202* (2021.01);
(Continued)

(58) Field of Classification Search
None
See application file for complete search history.

(56) References Cited

U.S. PATENT DOCUMENTS 2,273,244 A * 2/1942 Ambruster ........ H01M 10/6567
429/71
2007/0033899 A1* 2/2007 Kaida .................. B21C 33/004
52/783.1
(Continued)

FOREIGN PATENT DOCUMENTS

DE           3524706 A1 * 1/1987 ........ H01M 10/6567
DE   10 2013 207 872 A1   10/2014
(Continued)

OTHER PUBLICATIONS

English abstract for DE-10 2014 200 174.
English abstract for DE-10 2013 207 872.

*Primary Examiner* — Gregg Cantelmo
(74) *Attorney, Agent, or Firm* — Fishman Stewart PLLC (57) ABSTRACT

A housing part for a multi-part housing of a battery unit may include a bottom portion and a side wall structure arranged circumferentially on the outside along the bottom portion in the circumferential direction. The side wall structure may form at least one side wall portion along the circumferential direction. The side wall portion may have an inner wall facing the bottom portion and an outer wall, which may be spaced apart from the inner wall and may face away from the bottom portion. The inner wall may be connected to the bottom portion. The inner and outer walls may be connected to one another via a framework-like cavity structure having several webs, which may be adjacent to one another in the circumferential direction and which, in the cavity structure, may form several cavities adjacent in the circumferential direction and connecting the inner wall to the outer wall.

19 Claims, 10 Drawing Sheets

(51) Int. Cl.
*H01M 50/249* (2021.01)
*H01M 50/202* (2021.01)
*H01M 50/204* (2021.01)
*H01M 50/227* (2021.01)

(52) U.S. Cl.
CPC ....... *H01M 50/204* (2021.01); *H01M 50/227* (2021.01); *H01M 50/249* (2021.01); *H01M 2220/20* (2013.01)

(56) References Cited

U.S. PATENT DOCUMENTS

| | | | | |
|---|---|---|---|---|
| 2012/0223113 | A1* | 9/2012 | Gaisne | H01M 50/20 224/538 |
| 2013/0088045 | A1* | 4/2013 | Charbonneau | B62D 21/157 296/187.12 |
| 2015/0357606 | A1* | 12/2015 | Nishimura | B60L 50/64 429/176 |
| 2016/0072105 | A1* | 3/2016 | Muto | B60R 16/04 429/175 |
| 2017/0200928 | A1* | 7/2017 | Yi | B65D 25/107 |
| 2018/0186227 | A1* | 7/2018 | Stephens | B62D 21/15 |
| 2018/0272853 | A1 | 9/2018 | Wang et al. | |
| 2018/0337377 | A1* | 11/2018 | Stephens | B60L 50/64 |

FOREIGN PATENT DOCUMENTS

| | | | | |
|---|---|---|---|---|
| DE | 10 2014 200 174 A1 | 7/2015 | | |
| DE | 102016125693 A1 * | 6/2018 | ........ | H01M 10/6556 |
| EP | 2 332 761 A1 | 6/2011 | | |

\* cited by examiner

BATTERY HOUSING PART

CROSS-REFERENCE TO RELATED APPLICATIONS

This application claims priority to German Patent Application No. DE 10 2019 206 408.6, filed on May 3, 2019, the contents of which is hereby incorporated by reference in its entirety.

TECHNICAL FIELD

The present invention relates to a housing part for a multi-part housing of a battery unit. The invention further relates to a multi-part housing comprising a housing part of this type as well as a motor vehicle comprising a housing of this type.

BACKGROUND

A battery housing comprising a metallic frame is described in EP 2 332 761, wherein the metallic frame is arranged next to a plastic outer wall of a battery compartment.

It is a disadvantage of the known prior art that in the event of an external mechanical impact on the battery housing, the metallic frame transfers the mechanical impact essentially in an undampened manner to the plastic outer wall of the battery compartment. This may lead to a functional impairment or even to a destruction of the battery compartment and/or of a battery arranged therein.

SUMMARY

The present invention thus deals with the problem of specifying an improved or at least an alternative embodiment of a housing part of a multi-part housing of a battery unit, which in particular has an improved dampening and/or weakening of external mechanical impacts and/or which can in particular be produced simpler and more cost-efficiently.

This problem is solved according to the invention by means of the subject matters of the independent claims. Advantageous embodiments are subject matter of the dependent claims.

The present invention is based on the general idea of forming a framework-like cavity structure, which deforms in response to an external mechanical impact and thus leads to a dampening and/or weakening of the mechanical impact, in a side wall structure of the housing part.

The housing part according to the invention for a multi-part housing of a battery unit has a bottom portion and a side wall structure. The side wall structure is arranged circumferentially on the outside along the bottom portion in the circumferential direction, wherein the side wall structure forms at least one side wall portion along the circumferential direction. A first direction of extension and, aligned transversely therewith, a second direction of extension can be provided, which define and/or span a bottom plane. The bottom portion can be aligned and/or arranged essentially along and/or in this bottom plane. The bottom portion can be formed at least section by section in an essentially plate-shaped manner comprising an essentially rectangular circumferential contour. The bottom portion can comprise a bottom inner surface and a bottom outer surface spaced apart therefrom. The bottom outer surface can form at least one reinforcing rib. The bottom outer surface can have several reinforcing ribs spaced apart from one another.

The side wall structure can have four side wall portions, wherein a first side wall portion and a second side wall portion can extend essentially along the first direction of extension, wherein these side wall portions can be arranged spaced apart from one another along the second direction of extension. A third side wall portion and a fourth side wall portion can extend essentially along the second direction of extension, wherein these side wall portions can be arranged spaced apart from one another along the first direction of extension.

The side wall portion has an inner wall facing the bottom portion and an outer wall, which is spaced apart from the inner wall and faces away from the bottom portion, wherein the inner wall is connected to the bottom portion. The inner wall can be connected to the bottom inner surface of the bottom portion. The inner wall can end in the bottom inner surface of the bottom portion. The inner wall and/or the outer wall can each be arranged in a plane, which is aligned essentially transversely with the bottom plane.

The inner wall and the outer wall are connected to one another via a framework-like cavity structure. The cavity structure has several webs, which are adjacent to one another in the circumferential direction and which, in the cavity structure, form several cavities, which are adjacent in the circumferential direction and which connect the inner wall to the outer wall. The cavity structure can have several webs, which are adjacent to one another along the first direction of extension and/or along the second direction of extension and which, in the cavity structure, form several cavities, which are adjacent along the first direction of extension and/or along the second direction of extension and which connect the inner wall to the outer wall. A first group of webs can be aligned at an angle, in particular at an angle of 45°, with the first direction of extension and/or to the second direction of extension. A second group of webs can be aligned essentially parallel with the first direction of extension and/or to the second direction of extension.

The housing part can be formed in one piece and/or in one part. The housing part can be produced in one piece and/or in one part by means of primary forming or forming. The cavities can be formed in a housing part material-free manner.

In the case of an external mechanical impact on the housing part, in particular on the outer wall, the external mechanical impact is at least partially dampened and/or weakened by means of a deformation of the cavity structure, in particular the webs thereof. Damage to the inner wall and/or to a battery unit arranged in the housing part can be prevented or at least reduced thereby. The side wall structure can thus form a crash protection structure and/or a crush zone.

In the case of an advantageous further development of the solution according to the invention, it is provided that the inner wall and the outer wall are connected by means of an intermediate wall. The intermediate wall is aligned essentially transversely with the inner wall and outer wall, wherein the intermediate wall is aligned essentially parallel with the bottom portion. The intermediate wall can be aligned and/or formed parallel with the bottom plane. A height direction can be defined, which is aligned perpendicular with the first direction of extension and perpendicular to the second direction of extension. The intermediate wall can be arranged along this height direction spaced apart from the bottom portion. Viewed along the height direction, the intermediate wall can be arranged essentially centrally between the inner wall and the outer wall. Viewed along the height direction, the intermediate wall can be arranged essentially centrally and/or in a central plane relative to the housing part.

The intermediate wall penetrates the cavity structure in the circumferential direction and divides the cavity structure into a first cavity structure portion comprising webs and cavities, and a second cavity structure portion comprising webs and cavities. The first cavity structure portion and the second cavity structure portion can be formed similarly, in particular symmetrically and/or mirror-symmetrically relative to the intermediate wall. It can be provided that the first cavity structure portion and the second cavity structure portion fill an essentially identical room volume.

The outer wall, the inner wall, and the intermediate wall can form an H-shaped cross section (a capital H) transversely to the circumferential direction and/or direction of extension.

The intermediate wall leads to a higher mechanical resistance of the side wall structure.

In the case of a further advantageous embodiment of the solution according to the invention, it is provided that the cavities of the cavity structure each end in a front opening of a front side of the side wall portion, in particular perpendicular to the circumferential direction. The cavities can extend along the height direction, which is perpendicular to the circumferential direction and/or perpendicular to the bottom plane and/or to the bottom portion. It can be provided thereby that each cavity of the cavity structure in each case ends in its own and/or separate front opening of a front side of the side wall portion, in particular perpendicular to the circumferential direction.

The advantage of this is that the required amount of material can be minimized by means of the front openings, and that the production costs can thus also be reduced.

This further development of the solution according to the invention is particularly advantageous when the housing part is produced in one piece and/or in one part by means of primary forming or forming with at least two tool structures. The cavity structure portions are separated by an intermediate wall, which is arranged in a separating plane of the two tool structures. Due to the offset intermediate wall, the penetration depth of the tool structures corresponds to approximately half the component height of the housing part, wherein the tool structures can be produced in a simplified manner and the housing can be demolded more easily.

In the case of an advantageous further development of the solution according to the invention, it is provided that the cavities have a triangular cross sectional contour transversely to a cavity longitudinal direction. The cavity longitudinal direction can be aligned parallel with the height direction or transversely to the circumferential direction. The triangular cross sectional contour can form an isosceles triangle or a right-angled triangle. The cross sectional contour of all cavities can be similar. A first group of cavities can have a first cross sectional contour, wherein a second group of cavities can have a second cross sectional contour, wherein the first cross sectional contour differs from the second cross sectional contour. It can be provided that the cavity longitudinal directions of all cavities are aligned essentially parallel with one another. An advantageous ratio of amount of material to room volume can be attained thereby.

In the case of a further advantageous embodiment of the solution according to the invention, it is provided that the webs are connected to the inner wall via inner nodes and to the outer wall via outer nodes. The inner nodes have first inner nodes, in which only a single web is in each case connected to the inner wall. The outer nodes have first outer nodes, in which only a single web is in each case connected to the outer wall. The inner nodes have second inner nodes, in which exactly two or three or more webs are in each case connected to the inner wall. The outer nodes have second outer nodes, in which exactly two or three or more webs are in each case connected to the outer wall.

The inner nodes, in particular the first inner nodes and/or the second inner nodes, and/or the outer nodes, in particular the first outer nodes and/or the second outer nodes, can have a node recess, in order achieve material savings and a weight reduction. In the case of a housing part, which is and/or will be made by means of primary forming, a production-related sink mark can be reduced and/or prevented by means of a node recess of this type. In other words, the material accumulation in the case of primarily formed components is reduced, which reduces the production-related sink mark.

In the case of an advantageous further development of the solution according to the invention, it is provided that the outer wall has a first wall thickness or outer wall thickness, which is smaller than a second wall thickness or inner wall thickness of the inner wall. The ratio of outer wall thickness to inner wall thickness can be from 1:6 to 1:1, in particular 1:4. The mechanical stiffness of the outer wall can be reduced thereby, so that it also contributes to the weakening of the external impact by means of deformation.

The inner wall thickness of the inner wall can preferably be designed to be so wide that a sealing groove for receiving a seal and/or a sealing flange can be formed thereon.

In the case of a further advantageous embodiment of the solution according to the invention, it is provided that the first wall thickness or outer wall thickness corresponds essentially to a third wall thickness or intermediate wall thickness of the intermediate wall, and/or that a partial outer wall has a height, based on the intermediate wall, which is smaller than a length of the intermediate wall.

The ratio of outer wall thickness to intermediate wall thickness can be from 1:0.5 to 1:5, in particular 1:1. The ratio of length of the intermediate wall to height of the partial outer wall can be from 4:1 to 1:1, in particular 2:1. The inner wall can preferably be designed to be so wide that a sealing groove for receiving a seal and/or a sealing flange can be formed thereon.

This leads to an optimal design of the housing part in the stress ratio of production costs, material use, and required protective function by means of the side wall structure.

In the case of a further advantageous embodiment of the solution according to the invention, it is provided that the side wall structure, in particular the side wall structure of one of the housing parts or of both housing parts, has at least one mounting portion for receiving a functional element. The functional element can form and/or comprise an insert of metal, preferably of aluminum, and/or an insert of plastic (for example a pultruded tube and/or a UD tape), and/or an insert of elastomer for dampening and/or sealing and/or force absorption. The functional element can be formed to receive electrical lines and/or temperature control lines. Temperature control lines can also be integrally molded on the housing part, for example welded or extruded. The lines, in particular the temperature control lines, can also be pressed on or welded on. The mounting portion can form a recess, into which the functional element can be inserted and/or plugged at least partially. The functional element can be formed at least section by section as solid body and/or at least section by section as hollow body.

In the case of an advantageous further development of the solution according to the invention, it is provided that the mounting portion is formed at least section by section by the cavity structure, and/or that the mounting portion is formed at least section by section by the inner wall.

In the case of a further advantageous embodiment of the solution according to the invention, it is provided that the inner wall has an inner wall height and that the outer wall has an outer wall height, wherein the inner wall height and the outer wall height are different. The inner wall height can be smaller than the outer wall height. The inner wall height can be larger than the outer wall height.

The outer wall, the inner wall, and the intermediate wall can form an h-shaped cross section (lowercase h) transversely to the circumferential direction and/or direction of extension. The material usage and the production costs can be reduced thereby.

In the case of an advantageous further development of the solution according to the invention, it is provided that the housing part is formed of plastic, and/or that the cavity structure is formed at least section by section in a foam-like manner, and/or that the cavities of the cavity structure are at least partially filled with a foam-like material. The housing part can be formed by means of primary forming, in particular as pressure die casting, injection molded part, sand-cast part or the like, or by means of forming, in particular by means of pressing methods, such as, for example, SMC, GMT or the like.

The invention further relates to a multi-part housing of a battery unit comprising a first housing part according to the invention and comprising a second housing part according to the invention, wherein the first housing part and the second housing part are aligned with one another such that front sides of the side wall structures rest on one another, wherein the bottom portions of the housing parts are spaced apart from one another. It can be provided thereby that the inner walls of the first housing part and of the second housing part as well as the bottom inner surfaces of the first housing part and of the second housing part limit a housing interior, in which a battery unit can be arranged. A battery unit of this type can rest and/or be positioned on at least one bottom inner surface.

The first housing part and the second housing part can be connected to one another by means of fastening means and/or in a positive and/or negative manner.

The first housing part and the second housing part can be connected to one another by means of screwing and/or welding and/or adhering and/or crimping and/or clipping and/or by means of press fit.

The advantage of this is that the first housing part and the second housing part are formed essentially similarly and/or identically, and that the number of the required production tools can thus be reduced for the production of the multi-part housing.

It can be provided that the side wall structure, in particular the side wall structure of one of the housing parts or of both housing parts, has at least one mounting portion for receiving a functional element.

In the case of an advantageous further development of the solution according to the invention, it is provided that a first functional element is arranged between and/or inside the side wall structures, wherein the first functional element is at least partially arranged in the side wall structure of the first housing part, and/or wherein the first functional element is at least partially arranged in the side wall structure of the second housing part. The first functional element can at least partially be arranged between and/or inside the cavity structures of the side wall structures. The side wall structures and/or cavity structures can have corresponding mounting portions. The mounting portion can form a recess, into which the functional element can be inserted and/or plugged at least partially.

The first functional element can form and/or comprise an insert of metal, preferably of aluminum, and/or an insert of plastic (for example a pultruded tube and/or a UD tape), and/or an insert of elastomer for dampening and/or sealing and/or force absorption. The first functional element can be formed to receive electrical lines and/or temperature control lines. Temperature control lines can also be integrally molded on the housing part, for example welded or extruded. The lines, in particular the temperature control lines, can also be pressed on or welded on. The first functional element can be formed at least section by section as solid body and/or at least section by section as hollow body.

The mechanical resistance and/or the protective effect and/or the functionality of the multi-part housing can be increased thereby.

In the case of a further advantageous embodiment of the solution according to the invention, it is provided that a second functional element is arranged between and/or inside the inner walls, wherein the second functional element is at least partially arranged in the inner wall of the first housing part, and/or wherein the second functional element is at least partially arranged in the inner wall of the second housing part. The inner walls can have corresponding mounting portions. The respective mounting portion can form a recess, into which the functional element can be inserted and/or plugged at least partially.

The second functional element can form and/or comprise an insert of metal, preferably of aluminum, and/or an insert of plastic (for example a pultruded tube and/or a UD tape), and/or an insert of elastomer for dampening and/or sealing and/or force absorption. The second functional element can be formed to receive electrical lines and/or temperature control lines. Temperature control lines can also be integrally molded on the housing part, for example welded or extruded. The lines, in particular the temperature control lines, can also be pressed on or welded on. The second functional element can be formed at least section by section as solid body and/or at least section by section as hollow body.

The mechanical resistance and/or the protective effect and/or the functionality of the multi-part housing can be increased thereby.

In the case of an advantageous further development of the solution according to the invention, it is provided that the first functional element and/or the second functional element forms an insert for dampening and/or sealing and/or force absorption, and/or that the first functional element and/or the second functional element comprises a temperature control line and/or electrical lines.

The mechanical resistance and/or the protective effect and/or the functionality of the multi-part housing can be increased thereby.

The invention further relates to a motor vehicle comprising a battery unit, wherein the motor vehicle has a housing according to the invention, wherein the battery unit is arranged in this housing. The motor vehicle can be an electric vehicle and/or a hybrid vehicle and/or a vehicle comprising an electrical drive unit, in particular an electrically driven electric drive motor. The battery unit can supply the electrical drive unit with electrical power, which can be transported, for example, via electrical lines, wherein electrical lines of this type can be guided through the housing via corresponding lead-throughs. If the housing has and/or forms temperature control lines, the latter can be fluidically connected to a cooling system of the motor vehicle. The battery unit can be an electrical energy storage, in particular a traction battery, comprising an energy storage cell or several energy storage cells.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically

DETAILED DESCRIPTION

Figure 1:
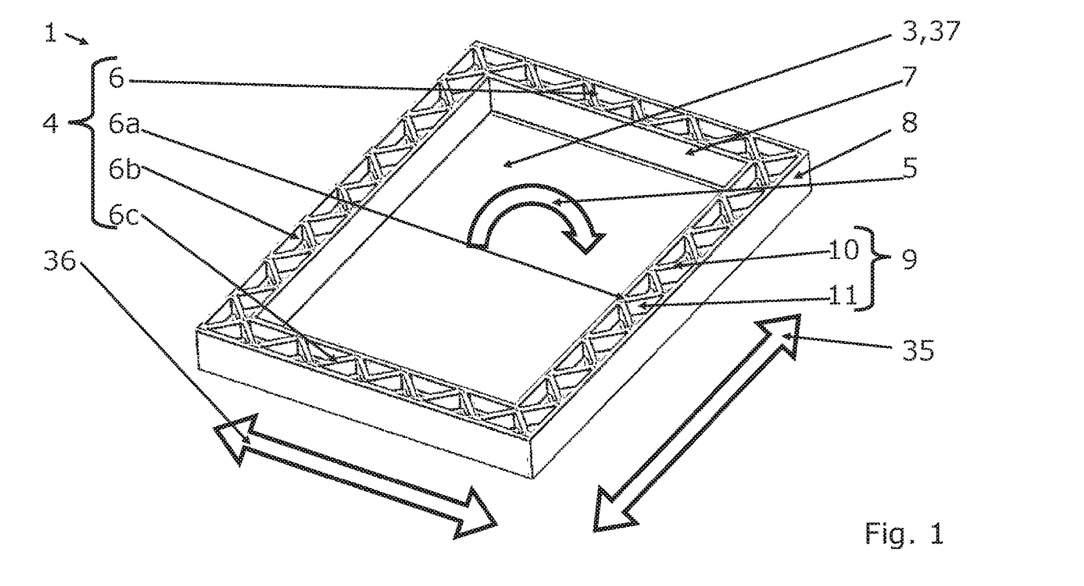
FIG. 1 shows a perspective view of a housing part according to the invention in an interior view.
Figure 4:
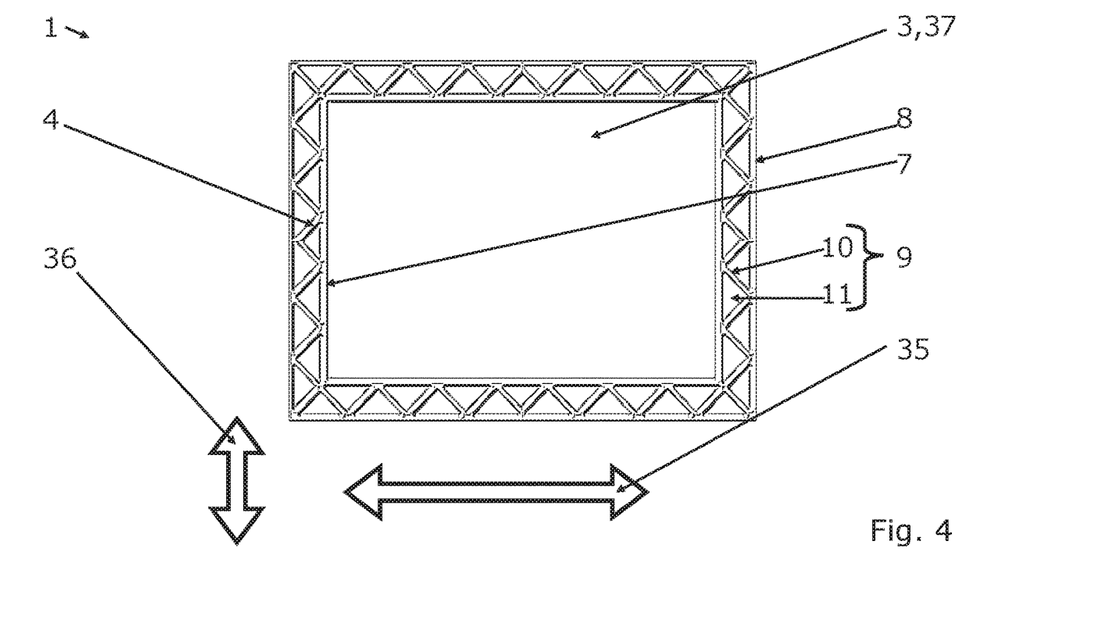
FIG. 4 shows a top view onto the housing part according to FIG. 1.
Figure 5:
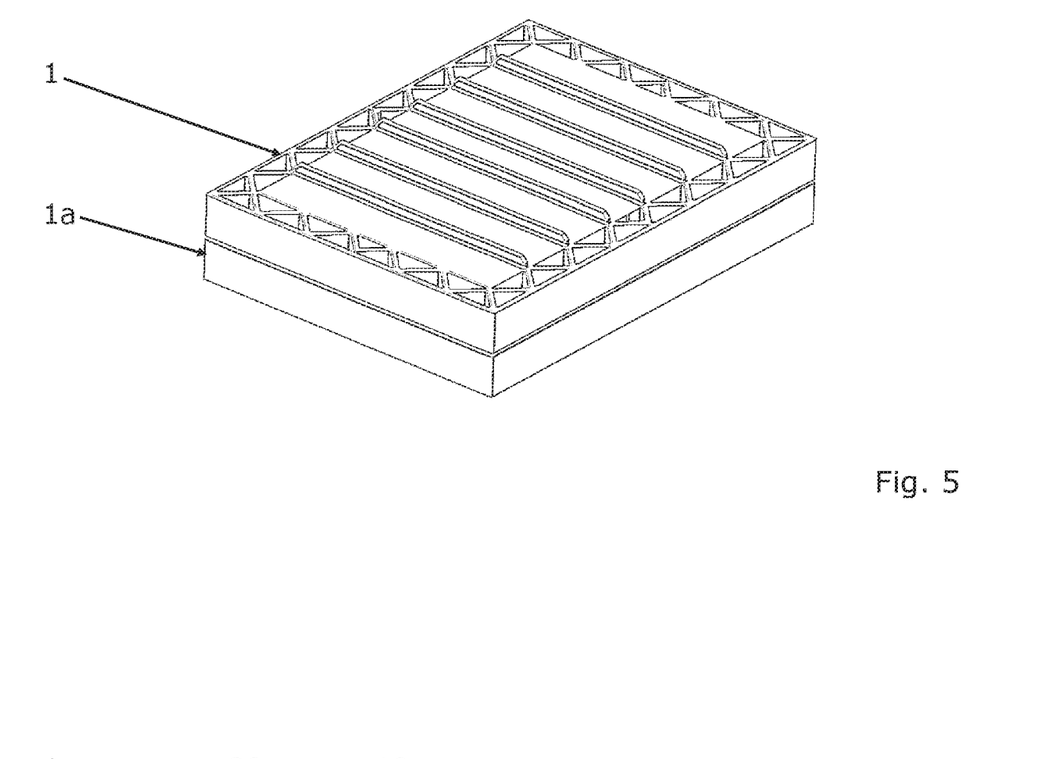
FIG. 5 shows a perspective view of a housing according to the invention.

A housing part 1 according to the invention is illustrated in a perspective view in FIG. 1 and in a top view in FIG. 4. The housing part 1 for a multi-part housing 2, which is illustrated in FIG. 5, comprises a bottom portion 3 and a side wall structure 4. A bottom inner surface 37 of the bottom portion 3 is visible in FIG. 1 and in FIG. 4.

The side wall structure 4 is arranged circumferentially on the outside along the bottom portion in the circumferential direction 5, wherein the side wall structure 4 forms at least one side wall portion (6, 6a, 6b, 6c) along the circumferential direction 5.

A first direction of extension 35 and, aligned transversely therewith, a second direction of extension 36 define and/or span a bottom plane. The bottom portion 3 can be aligned and/or arranged essentially along and/or in this bottom plane. The bottom portion 3 can be formed in an essentially plate-shaped manner comprising an essentially rectangular circumferential contour.

The side wall structure 4 has four side wall portions 6, 6a, 6b, 6c, wherein a first side wall portion 6a and a second side wall portion 6b extend essentially along the first direction of extension 35, wherein these side wall portions 6a, 6b are arranged spaced apart from one another along the second direction of extension 36. A third side wall portion 6 and a fourth side wall portion 6c extend essentially along the second direction of extension 36, wherein these side wall portions 6, 6c are arranged spaced apart from one another along the first direction of extension 35. The side wall portions 6, 6a, 6b, 6c can transition integrally into one another.

The side wall portions 6, 6a, 6b, 6c each have an inner wall 7 facing the bottom portion 3 and an outer wall 8, which is spaced apart from the inner wall 7 and faces away from the bottom portion 3, wherein the inner wall 7 is connected to the bottom portion 3. The inner wall 7 and the outer wall 8 of the side wall portions 6, 6a, 6b, 6c are connected to one another via a framework-like cavity structure 9, wherein the cavity structure 9 has several webs 10, which are adjacent to one another in the circumferential direction 5 and which, in the cavity structure 9, form several cavities 11, which are adjacent in the circumferential direction 5 and which connect the inner wall 7 to the outer wall 8.

At least a first group of webs is aligned at an angle, in particular at an angle of 45°, with the first direction of extension 35 and/or with the second direction of extension 36 and/or the circumferential direction 5.

Figure 2:
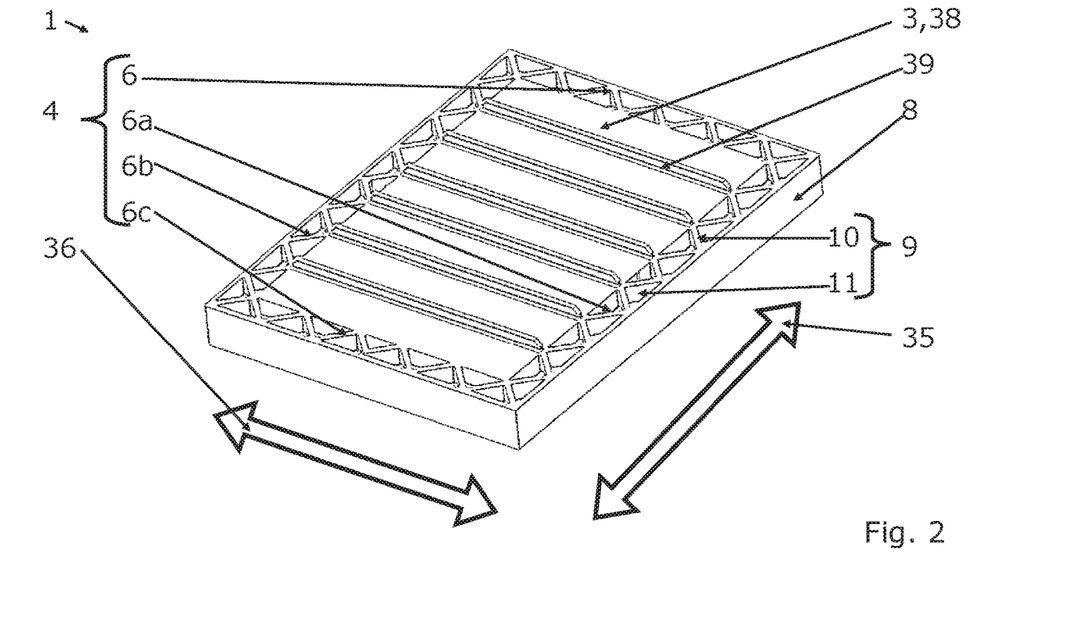
FIG. 2 shows a perspective view of a housing part according to the invention in an exterior view.
Figure 3:
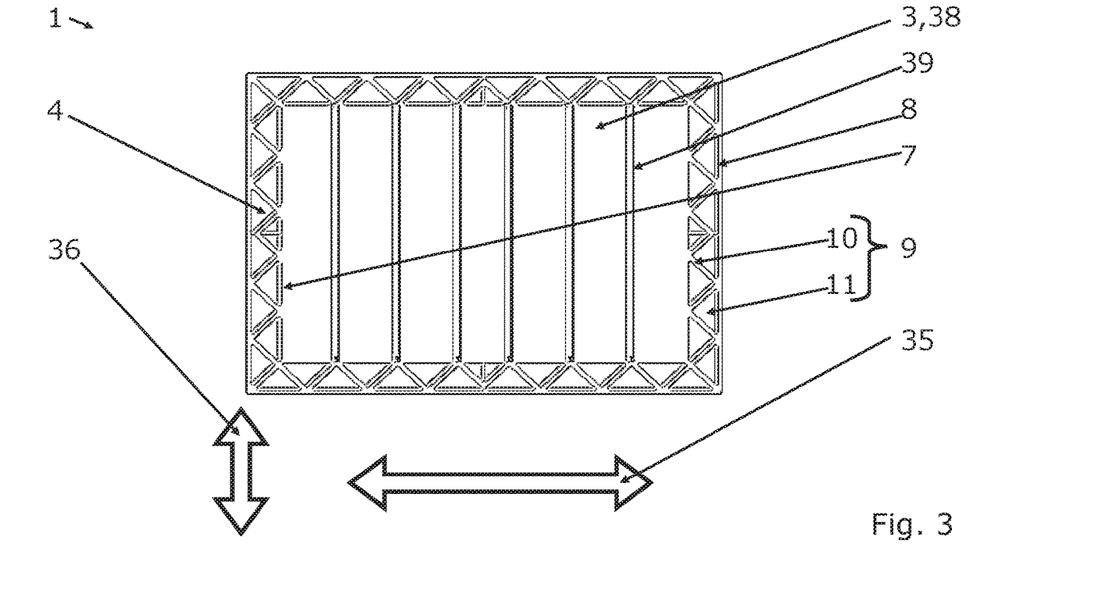
FIG. 3 shows a top view onto the housing part according to FIG. 2.

A perspective exterior view of the housing part 1 according to the invention is shown in FIG. 2. A top view of the housing part 1 of FIG. 2 is shown in FIG. 3. In contrast to FIG. 1 and FIG. 4, the bottom inner surface 37 of the bottom portion 3 cannot be seen, but the bottom outer surface 38 of the bottom portion 3. The bottom inner surface 37 and is spaced apart from the bottom outer surface 38 by the material of the bottom portion 3 or by the bottom portion 3, respectively. The bottom outer surface 37 forms at least one reinforcing rib 39. Several reinforcing ribs 39, which are spaced apart from one another, are shown in FIG. 4. These reinforcing ribs 39 can be connected to ends of two webs 10 located opposite one another and/or can extend between the ends of two webs 10 located opposite one another.

Figure 10:
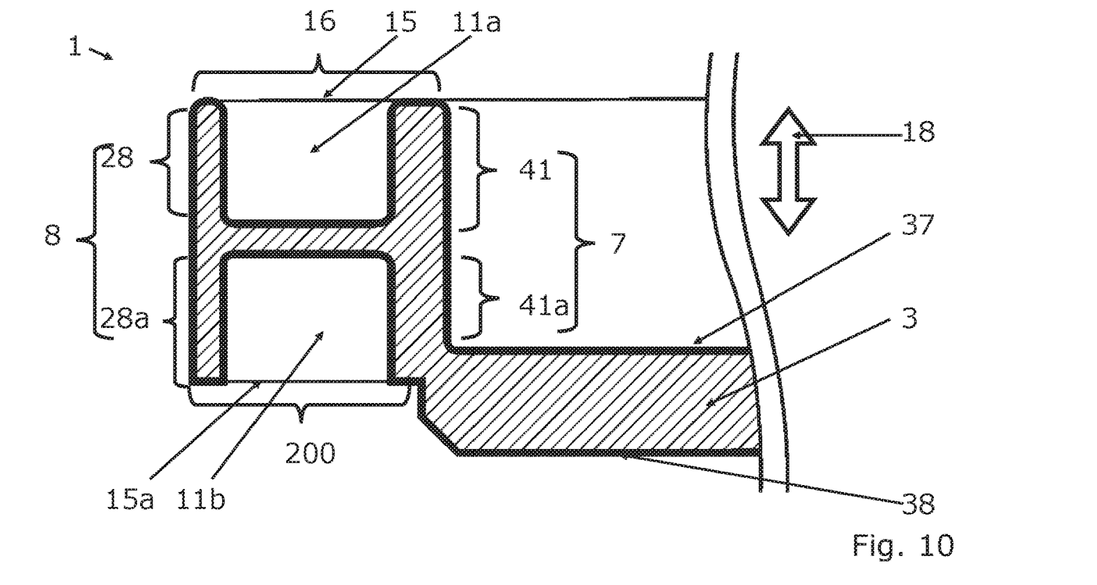
FIG. 10 shows a sectional view through a housing part according to the invention.

FIG. 5 shows a multi-part housing 2 of a battery unit, wherein the housing 2 has a first housing part 1 according to the invention and a second housing part 1a according to the invention. The first housing part 1 and the second housing part 1a are aligned with one another such that front sides 16, 16a of the side wall structures 4, 4a rest against one another, wherein the bottom portions 3, 3a of the housing parts 1, 1a are spaced apart from one another. The housing part 1 and the housing part 1a are thereby constructed similarly. The front side 16 of the side wall structure 4 is illustrated in FIG. 10, which also corresponds to a front side 16a. A battery unit, which is not visible in the figures, can be arranged inside the housing 2.

Figure 6:
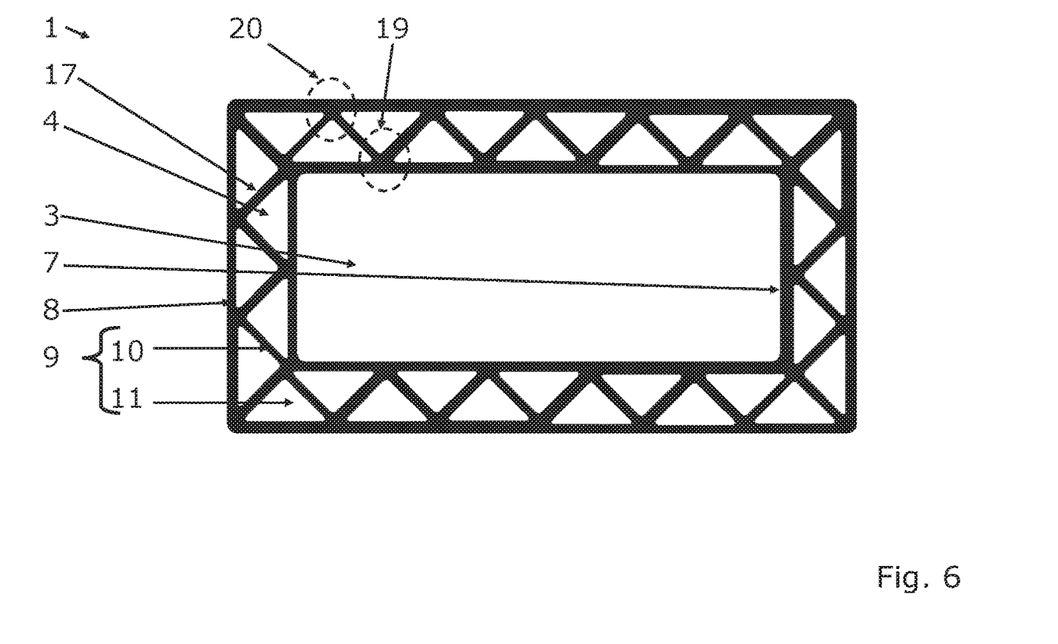
FIG. 6 shows a further top view onto a housing part according to the invention.
Figure 7:
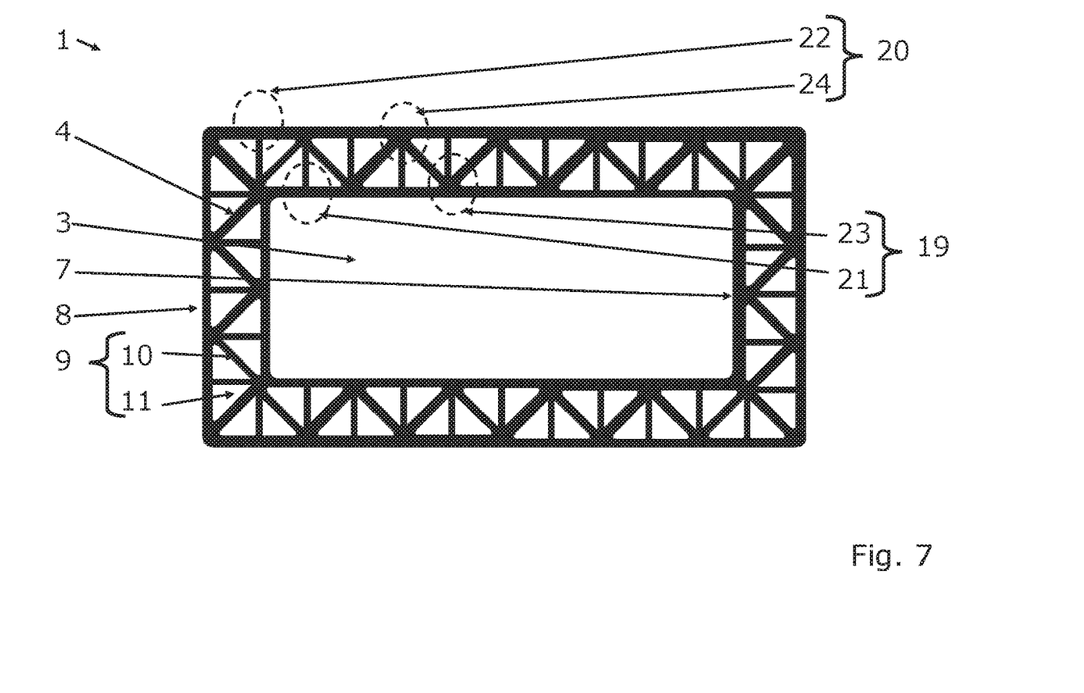
FIG. 7 shows a top view onto a further embodiment of a housing part according to the invention.
Figure 8:
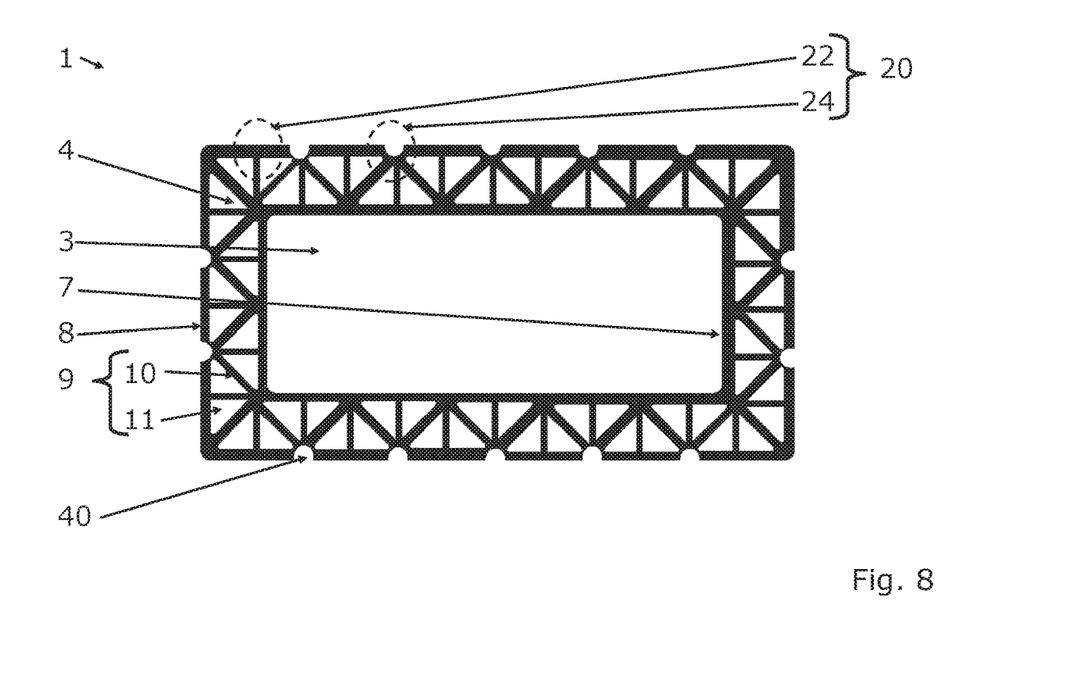
FIG. 8 shows a top view onto a further embodiment of a housing part according to the invention.

Further schematic top views of the housing part 1 according to the invention are shown in FIGS. 6 to 8. In FIG. 6, the webs 10 are connected to the inner wall 7 via inner nodes 19 and to the outer wall 8 via outer nodes 20. The cavities 11 have a triangular cross sectional contour 17 transversely to the cavity longitudinal direction 18 illustrated in FIG. 10.

In the embodiment of FIG. 7, the inner nodes 19 have first inner nodes 21, in which only a single web 10 is in each case connected to the inner wall 7. The outer nodes 20 have first outer nodes 22, in which only a single web 10 is in each case connected to the outer wall 8. The inner nodes 19 have second inner nodes 23, in which exactly two or three or more webs 10 are in each case connected to the inner wall 7. The outer nodes 20 have second outer nodes 24, in which exactly two or three or more webs 10 are in each case connected to the outer wall 8. A first outer node 22 is initially followed by a second outer node 24, which, in turn, is followed by a further first outer node 22, viewed in the circumferential direction 5 or along the first direction of extension 35, respectively, and/or the second direction of extension 36. This continues periodically along the circumferential direction 5. A first inner node 21 is initially followed by a second inner node 23, which, in turn, is followed by a further first inner node 21, viewed in the circumferential direction 5 or along the first direction of extension 35, respectively, and/or the second direction of extension 36. This continues periodically along the circumferential direction 5. The first inner nodes 21 and the first outer nodes 22 are arranged offset to one another in the circumferential direction 5.

In the embodiment of FIG. 8, the second outer nodes 24 each have a node recess 40, in order to achieve a material reduction. The node recess 40 can have a semicircular cross section.

Figure 9:
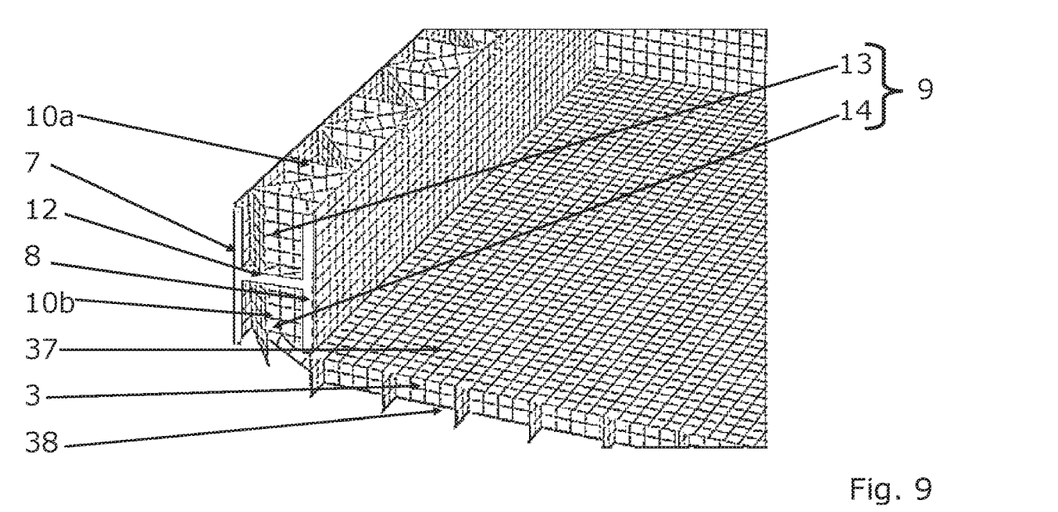
FIG. 9 shows a perspective sectional view through a housing part according to the invention.

A perspective sectional view through a housing part 1 according to the invention is shown in FIG. 9, wherein the inner wall 7 and the outer wall 8 in this embodiment are connected by means of an intermediate wall 12. The intermediate wall 12 is aligned essentially transversely with the inner wall 7 and outer wall 8. The intermediate wall 12 is further aligned essentially parallel with the bottom portion 3. The intermediate wall 12 penetrates the cavity structure 9 in the circumferential direction 5. The intermediate wall 12 divides the cavity structure 9 into a first cavity structure portion 13 comprising webs 10a and cavities 11a, and a second cavity structure portion 14 comprising webs 10b and cavities 11b, wherein the cavities 11a and cavities 11b are suggested in FIG. 10.

FIG. 10 shows a sectional view through a housing part 1 according to the invention. The outer wall 8, the inner wall 7, and the intermediate wall 12 form an H-shaped cross section (a capital H) transversely to the circumferential direction 5 and/or direction of extension 35, 36. The cavities 11a in each case end in a front opening 15 of a front side 16 of the respective side wall portion 6, 6a, 6b or 6c. The cavities 11b in each case end in a further front opening 15a of a further front side 200 of the respective side wall portion 6, 6a, 6b or 6c. The front side 16 and the front side 200 are spaced apart from one another. The outer wall 8 is divided by the intermediate wall 12 into a partial outer wall 28 and a further partial outer wall 28a. The inner wall 7 is divided by the intermediate wall 12 into a partial inner wall 41 and a further partial inner wall 41a. The partial inner wall 41a is connected to the bottom portion 3. The bottom outer surface 38, the front side 200, and the bottom inner surface 37 can be arranged in planes, which are offset to one another. It can be provided thereby that the front side 200 is arranged in a plane, which is arranged between the bottom outer surface 38 and the bottom inner surface 37.

Figure 11:
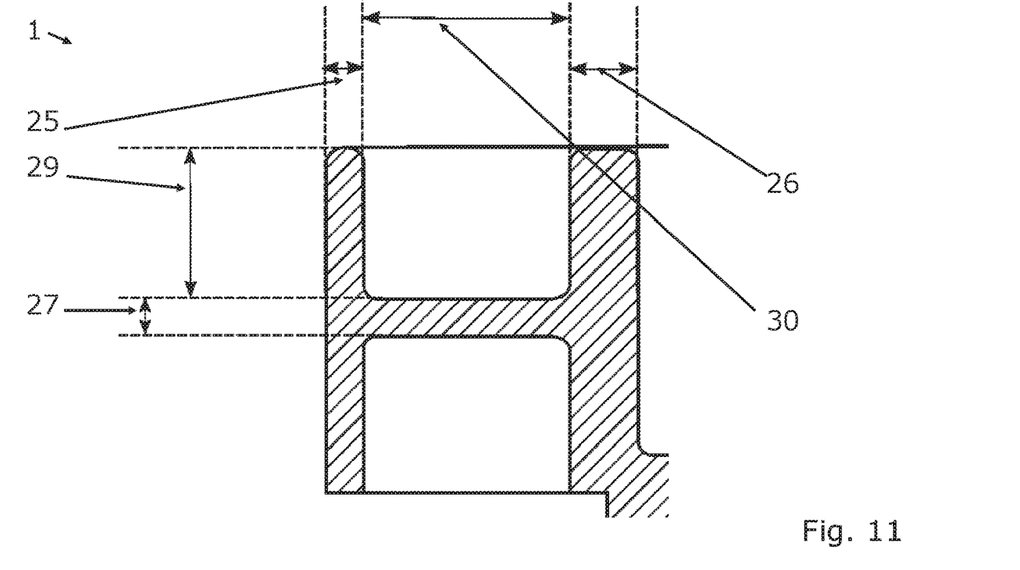
FIG. 11 shows a further sectional view through a housing part according to the invention.

FIG. 11 shows a sectional view through a housing part 1 according to the invention, wherein the outer wall 8 has a first wall thickness or outer wall thickness 25, which is smaller than a second wall thickness or inner wall thickness 26 of the inner wall 7. The first wall thickness or outer wall thickness 25 further corresponds essentially to a third wall thickness or intermediate wall thickness 27 of the intermediate wall 12. The partial outer wall 28 furthermore has a height 29, starting at the intermediate wall 12, which is smaller than a length 30 of the intermediate wall 12.

Figure 12:
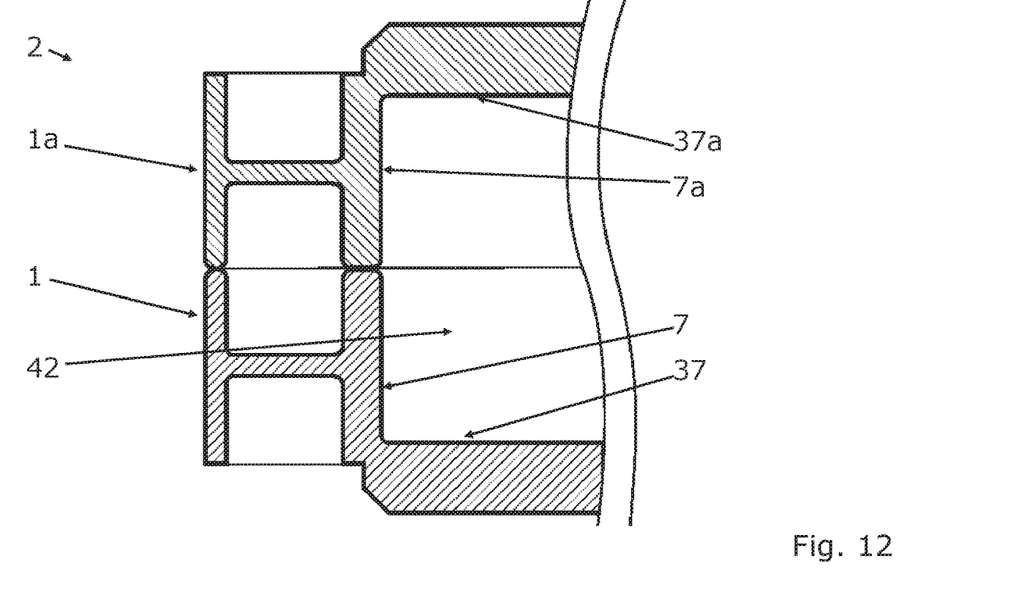
FIG. 12 shows a sectional view through a housing according to the invention.

FIG. 12 shows a sectional view through a housing 2 according to the invention comprising a first housing part 1 according to the invention and a second housing part 1a according to the invention. The inner wall 7 of the first housing part 1 and the inner wall 7a of the second housing part 1a as well as the bottom inner surface 37 of the first housing part 1 and the bottom inner surface 37a of the second housing part 1a limit a housing interior, which is illustrated in FIGS. 12 to 18 only section by section.

Figure 13:
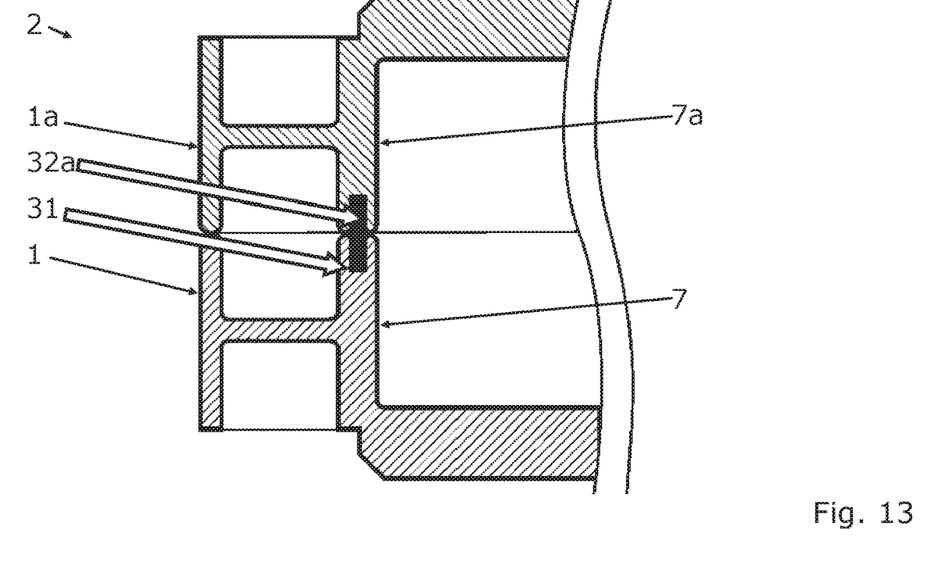
FIG. 13 shows a sectional view through a further embodiment of a housing according to the invention.

In the embodiment of FIG. 13, the inner walls 7 and 7a form a mounting portion 31, in which a second functional element 32a is inserted.

Figure 14:
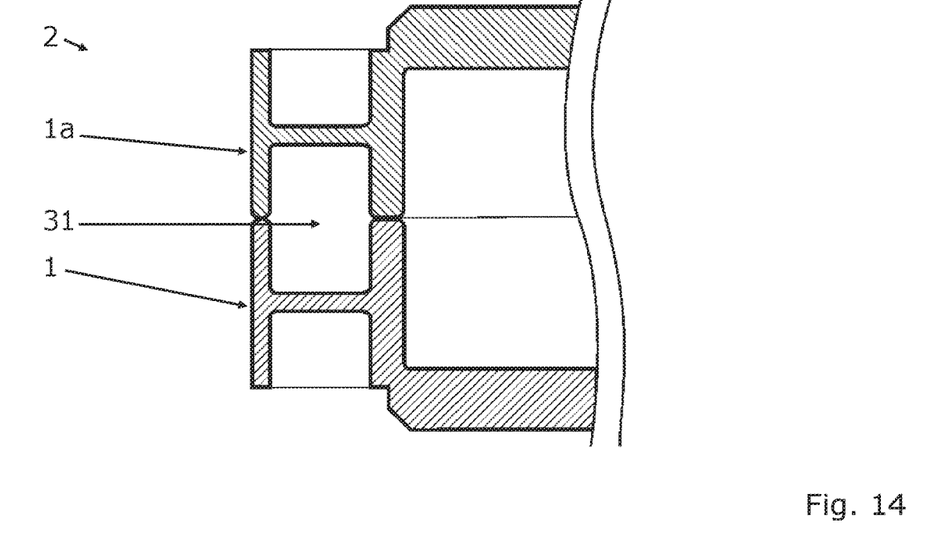
FIG. 14 shows a sectional view through a further embodiment of a housing according to the invention.

In the embodiment of FIG. 14, the side wall structures of the first housing part 1 and of the second housing part 1a form a mounting portion 31. This mounting portion 31 can be formed as recess and can form, for example, a temperature control line, through which a temperature control fluid can flow. It can also be provided that the mounting portion 31 is formed to guide and/or to receive electrical lines.

Figure 15:
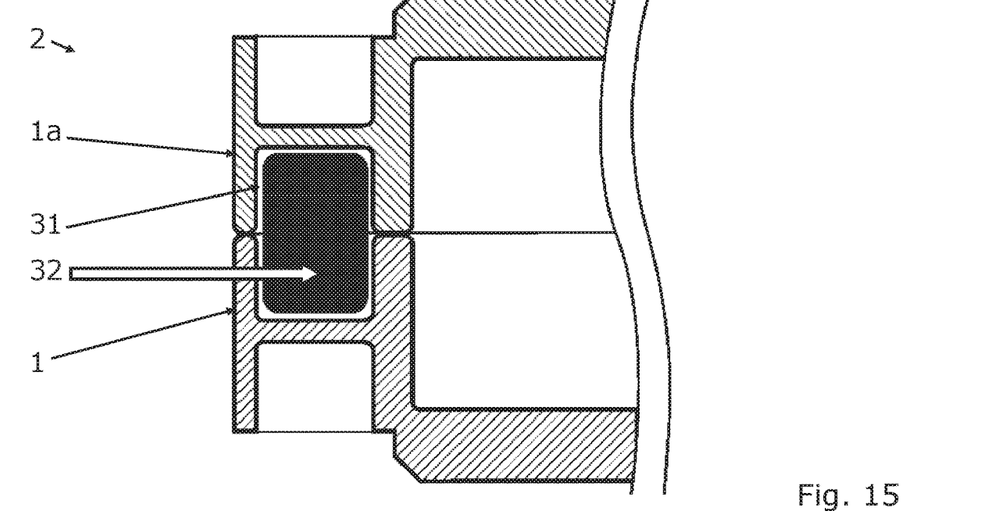
FIG. 15 shows a sectional view through a further embodiment of a housing according to the invention.
Figure 16:
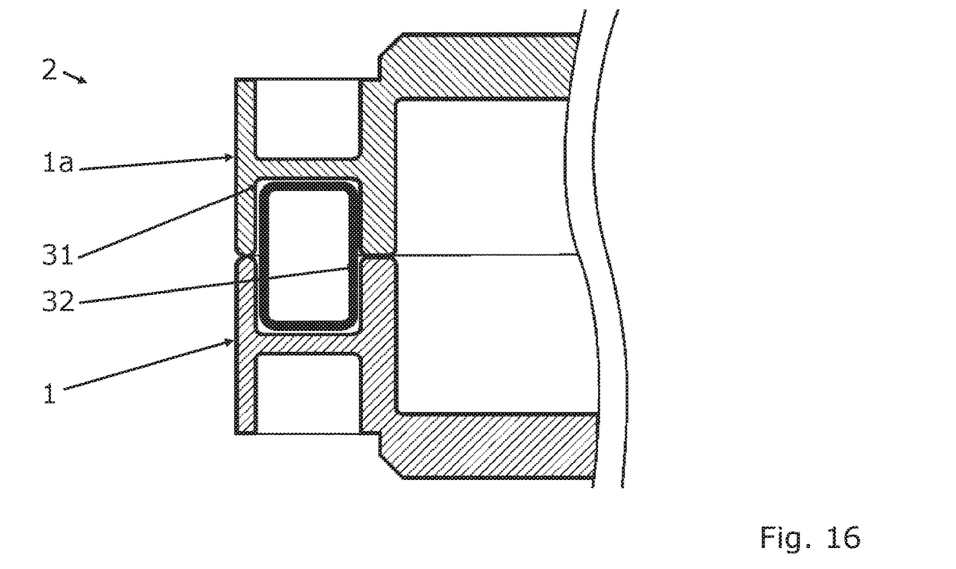
FIG. 16 shows a sectional view through a further embodiment of a housing according to the invention.
Figure 17:
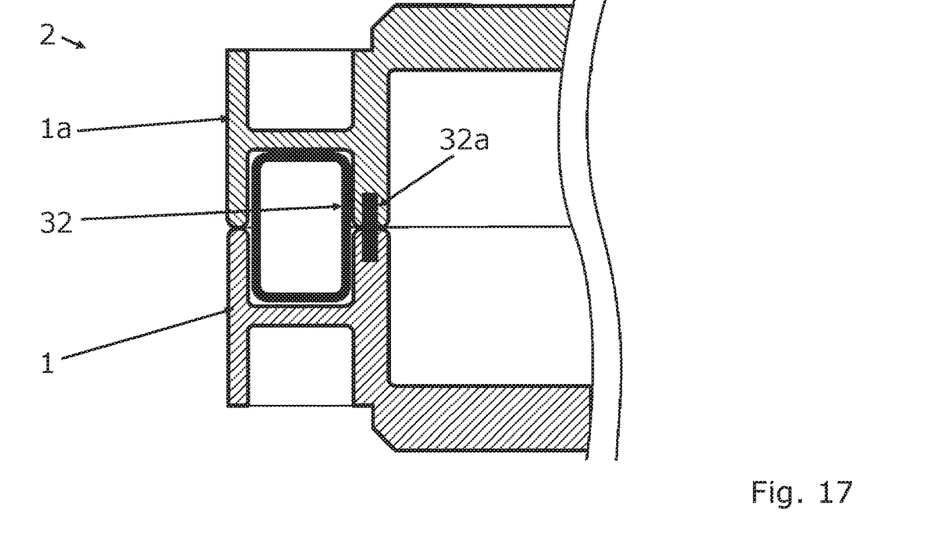
FIG. 17 shows a sectional view through a further embodiment of a housing according to the invention.

A first functional element 32 in the form of an insert, which increases for example the mechanical stability of the housing 2, can also be inserted into this mounting portion 31. As illustrated in FIG. 15, the first functional element 32 can be formed by a solid body. In a further embodiment, the first functional element 32 can be formed by a hollow body, as illustrated in FIG. 16. As illustrated in FIG. 17, the housing 2 according to the invention can have a first functional element 32 as well as a second functional element 32a in a further embodiment.

Figure 18:
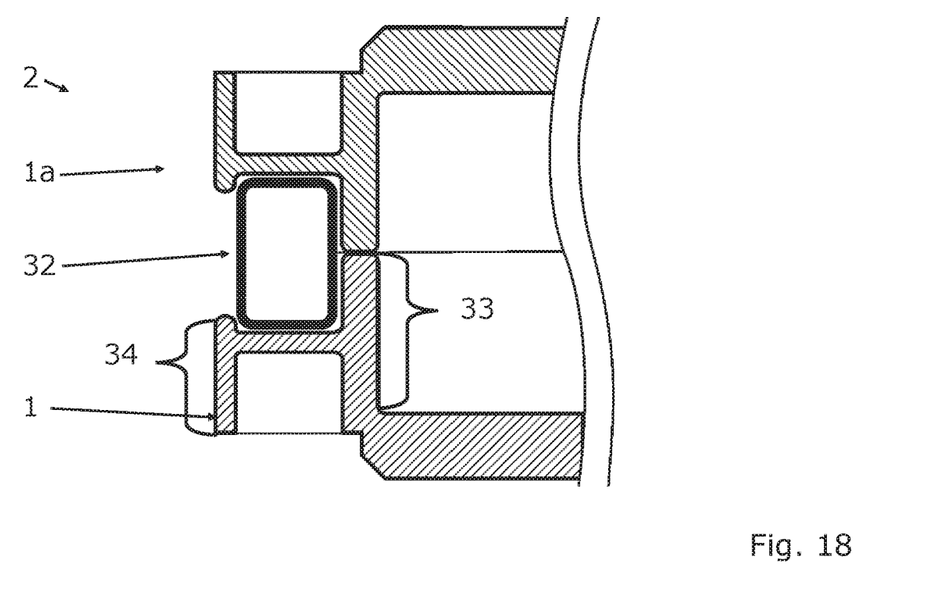
FIG. 18 shows a sectional view through a further embodiment of a housing according to the invention.

According to FIG. 18, the inner wall 7 can have an inner wall height 33 and the outer wall 8 can have an outer wall height 34, wherein the inner wall height 33 and the outer wall height 34 are different. The outer wall 8, the inner wall 7, and the intermediate wall 12, form an h-shaped cross section (a lowercase h) transversely to the circumferential direction 5 and/or direction of extension 35, 36.

Figure 19:
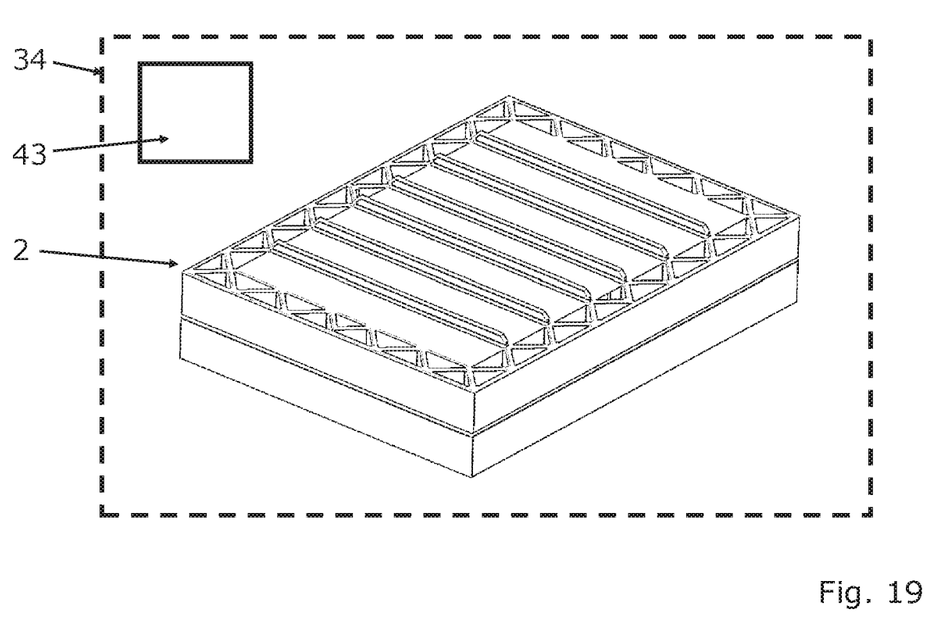
FIG. 19 shows, schematically, a motor vehicle according to the invention.

FIG. 19 shows, schematically, a motor vehicle 34 according to the invention, which comprises a non-illustrated battery unit or an electrical energy storage, respectively, which is arranged in the housing 2 according to the invention, wherein, starting at the battery unit, an electrically operated drive unit 43 is supplied with electrical power via non-illustrated electrical lines.

The invention claimed is:

1. A housing part for a multi-part housing of a battery unit, comprising:
   a bottom portion; and
   a side wall structure arranged along a perimeter of the bottom portion, the side wall structure forms at least one side wall portion, the side wall portion has an inner wall facing and connected to the bottom portion and an outer wall spaced apart from the inner wall, and the outer wall faces away from the bottom portion;

wherein the inner wall and the outer wall are connected to one another via a framework cavity structure and an intermediate wall, the intermediate wall is aligned essentially (i) transversely with the inner wall and outer wall and (ii) parallel with the bottom portion, and wherein the intermediate wall penetrates and divides the cavity structure into a first and a second cavity structure portion each comprising a plurality of webs that form a plurality of cavities.

2. The housing part according to claim 1, wherein the cavities of the cavity structure each end in a front opening of a front side of the side wall portion.

3. The housing part according to claim 1, wherein the cavities have a triangular cross sectional contour transversely to a cavity longitudinal direction.

4. The housing part according to claim 1, wherein:
the webs are connected to the inner wall via inner nodes and to the outer wall via outer nodes;
the inner nodes have first inner nodes, in which only a single web is in each case connected to the inner wall;
the outer nodes have first outer nodes, in which only a single web is in each case connected to the outer wall;
the inner nodes have second inner nodes, in which at least two webs are in each case connected to the inner wall; and
the outer nodes have second outer nodes, in which at least two webs are in each case connected to the outer wall.

5. The housing part according to claim 1, wherein the outer wall has a first wall thickness or outer wall thickness, which is smaller than a second wall thickness or inner wall thickness of the inner wall.

6. The housing part according to claim 5, wherein at least one of:
the first wall thickness or outer wall thickness corresponds essentially to a third wall thickness or intermediate wall thickness of the intermediate wall; and
a partial outer wall has a height, based on the intermediate wall, which is smaller than a length of the intermediate wall.

7. The housing part according to claim 1, wherein the side wall structure has at least one mounting portion for receiving a functional element.

8. The housing part according to claim 7, wherein at least one of:
the mounting portion is formed at least section by section by the cavity structure; and
the mounting portion is formed at least section by section by the inner wall.

9. The housing part according to claim 1, wherein:
the inner wall has an inner wall height;
the outer wall has an outer wall height; and
the inner wall height and the outer wall height are different.

10. The housing part according to claim 1, wherein:
the housing part is formed of plastic;
the cavity structure is formed at least section by section in a foam manner; and
the cavities of the cavity structure are at least partially filled with a foam material.

11. A multi-part housing of a battery unit, comprising:
a first housing part and a second housing part;
wherein each housing part includes a bottom portion and a side wall structure arranged along a perimeter of the bottom portion, the side wall structure forming at least one side wall portion, the side wall portion having an inner wall facing the bottom portion and an outer wall, which is spaced apart from the inner wall and faces away from the bottom portion, the inner wall being connected to the bottom portion, and the inner wall and the outer wall being connected to one another via a framework cavity structure having a plurality of webs, which are adjacent to one another and which, in the cavity structure, form a plurality of cavities, which are adjacent and which connect the inner wall to the outer wall;
wherein the first housing part and the second housing part are aligned with one another such that front sides of the respective side wall structures rest on one another; and
wherein the bottom portions of the respective housing parts are spaced apart from one another.

12. The housing according to claim 11, wherein at least one of:
a first functional element is arranged at least one of between and inside the side wall structures;
the first functional element is at least partially arranged in the side wall structure of the first housing part; and
the first functional element is at least partially arranged in the side wall structure of the second housing part.

13. The housing according to claim 12, wherein at least one of:
a second functional element is arranged at least one of between and inside the inner walls;
the second functional element is at least partially arranged in the inner wall of the first housing part; and
the second functional element is at least partially arranged in the inner wall of the second housing part.

14. The housing according to claim 13, wherein at least one of:
at least one of the first functional element and the second functional element forms an insert for at least one of dampening, sealing, and force absorption; and
at least one of the first functional element and the second functional element comprises at least one of a temperature control line and electrical lines.

15. A motor vehicle comprising;
a battery unit and a housing in which the battery unit is arranged;
wherein the housing includes a first housing part and a second housing part each having a bottom portion and a side wall structure arranged along a perimeter of the bottom portion, the side wall structure forming at least one side wall portion, the side wall portion having an inner wall facing the bottom portion and an outer wall, which is spaced apart from the inner wall and faces away from the bottom portion, the inner wall being connected to the bottom portion, and the inner wall and the outer wall being connected to one another via a framework cavity structure having a plurality of webs, which are adjacent to one another and which, in the cavity structure, form a plurality of cavities, which are adjacent and which connect the inner wall to the outer wall;
wherein the first housing part and the second housing part are aligned with one another such that front sides of the respective side wall structures rest on one another; and
wherein the bottom portions of the respective housing parts are spaced apart from one another.

16. The housing according to claim 11, wherein:
the inner wall and the outer wall are connected via an intermediate wall;
the intermediate wall is aligned essentially transversely with the inner wall and outer wall;

wherein the intermediate wall is aligned essentially parallel with the bottom portion; and wherein the intermediate wall penetrates and divides the cavity structure into a first cavity structure portion comprising webs and cavities, and a second cavity structure portion comprising webs and cavities.

17. The housing according to claim 11, wherein the cavities of the cavity structure each end in a front opening of a front side of the side wall portion.

18. The housing according to claim 11, wherein the cavities have a triangular cross sectional contour transversely to a cavity longitudinal direction.

19. The housing according to claim 11, wherein:

the webs are connected to the inner wall via inner nodes and to the outer wall via outer nodes;

the inner nodes have first inner nodes, in which only a single web is in each case connected to the inner wall;

the outer nodes have first outer nodes, in which only a single web is in each case connected to the outer wall;

the inner nodes have second inner nodes, in which at least two webs are in each case connected to the inner wall; and the outer nodes have second outer nodes, in which at least two webs are in each case connected to the outer wall.

\* \* \* \* \*